United States Patent [19]
Revelle et al.

[11] Patent Number: 5,579,951
[45] Date of Patent: Dec. 3, 1996

[54] APPARATUS FOR ORIENTING AND LOADING SOLID COMPACT MEDICAMENTS

[75] Inventors: David J. Revelle; Peter A. Pastecki, both of Rochester; Thomas C. Reiter, Hilton, all of N.Y.

[73] Assignee: Bayer Corporated, Parsippany, N.J.

[21] Appl. No.: 264,391

[22] Filed: Jun. 23, 1994

[51] Int. Cl.⁶ .................................................. B65G 59/00
[52] U.S. Cl. .................................. 221/95; 221/1; 221/17; 221/200; 221/281
[58] Field of Search ........................... 221/93, 95, 131, 221/156, 171, 172, 200, 281, 289, 296, 68, 1; 198/445, 446, 373, 382; 53/247

[56] References Cited

U.S. PATENT DOCUMENTS

| | | |
|---|---|---|
| 742,377 | 10/1903 | Ayers . |
| 817,852 | 4/1906 | Haseltine . |
| 1,042,785 | 10/1912 | Goulding . |
| 1,677,546 | 7/1928 | Clauss . |
| 2,233,466 | 3/1941 | Ayers ................................. 221/68 |
| 2,701,671 | 2/1944 | Lakso et al. ....................... 221/296 |
| 2,781,947 | 2/1957 | Webster et al. .................... 221/296 |
| 2,915,217 | 12/1959 | Chaplinski ......................... 221/68 |
| 2,973,109 | 2/1961 | Gable ................................ 214/8 |
| 3,417,542 | 12/1968 | Merrill et al. ..................... 221/93 |
| 3,446,397 | 5/1969 | Chambers .......................... 221/296 |
| 3,526,743 | 9/1970 | Spisak ............................... 221/68 |
| 3,545,164 | 12/1970 | Middleton ......................... 221/156 |
| 3,775,941 | 12/1973 | Bross ................................ 53/246 |
| 4,427,131 | 1/1984 | Facchini ............................ 221/173 |
| 4,828,142 | 5/1989 | McKnight ......................... 221/171 |
| 5,052,167 | 10/1991 | Scharch ............................. 53/247 |
| 5,102,009 | 4/1992 | Kato et al. ......................... 221/68 |
| 5,387,287 | 2/1995 | Reiter et al. ...................... 118/503 |
| 5,391,230 | 2/1995 | Pastecki et al. ................... 118/503 |

FOREIGN PATENT DOCUMENTS

| | | | |
|---|---|---|---|
| 2709787 | 9/1978 | Germany .................. B65G 47/14 |
| 57-160816A | 10/1982 | Japan ........................ B65G 47/14 |
| 3-79516A | 4/1991 | Japan ........................ B65G 59/06 |
| 3-85202 | 4/1991 | Japan ........................ B65B 1/30 |
| 0576559 | 4/1946 | United Kingdom ............. 221/68 |

*Primary Examiner*—H. Grant Skaggs
*Attorney, Agent, or Firm*—Orrick Herrington & Sutcliffe

[57] ABSTRACT

An apparatus (10) for orienting and loading solid compact medicaments, such as solid compact medicaments (A), into a carrier device (C) comprises a feeder (12) having a plurality of elongated first channels (20) through which the solid compact medicaments travel with an acute angle relative to a predetermined orientation of the carrier device (C). An orienting member (32) cooperating with the feeder (12) reorients the solid compact medicaments to the predetermined orientation as they exit the feeder (12). In an alternative embodiment, a pitch changing means (42) in fluid communications with the orienting means (32) provides for final orientation of the solid compact medicaments prior to loading in the carrier device (C).

15 Claims, 4 Drawing Sheets

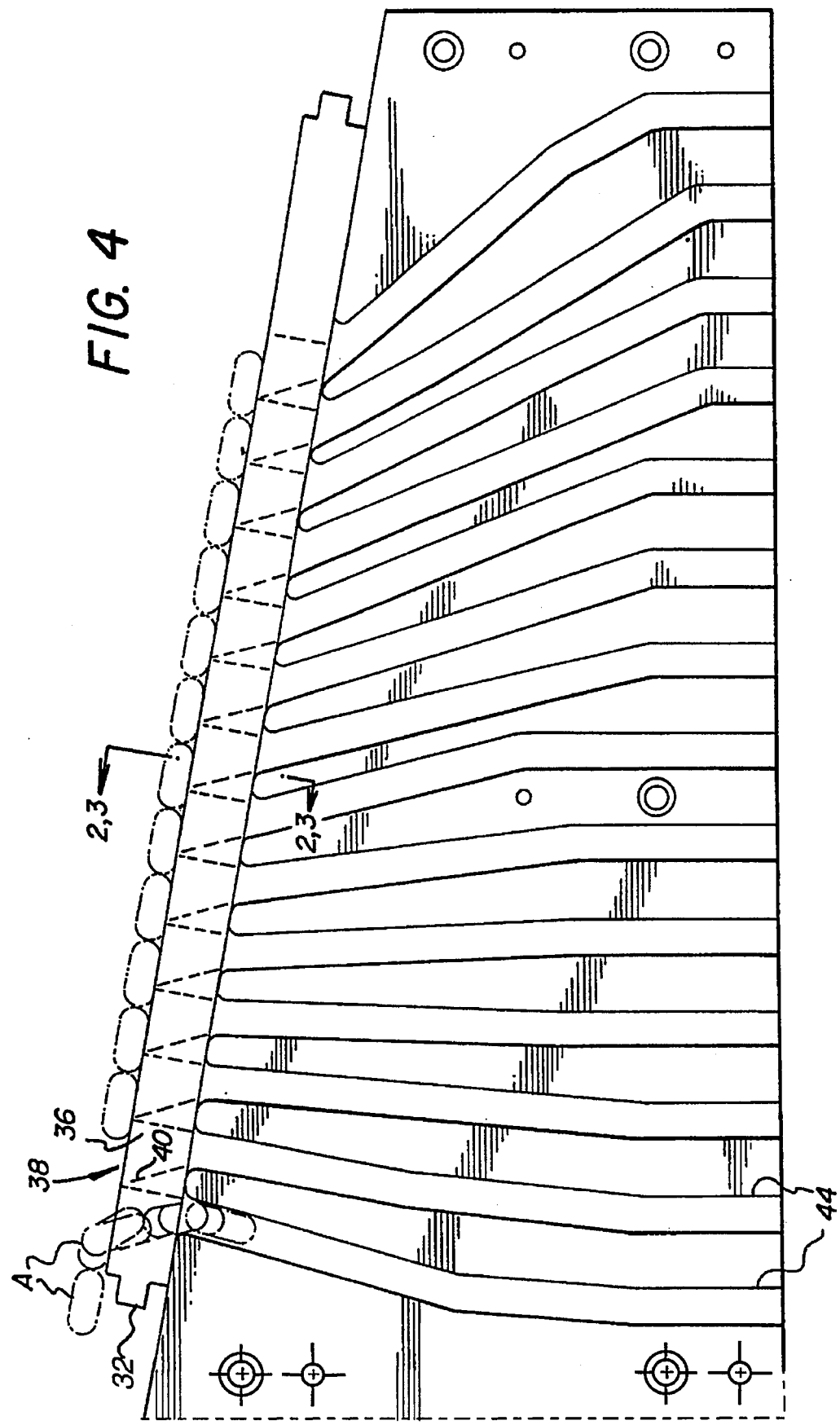

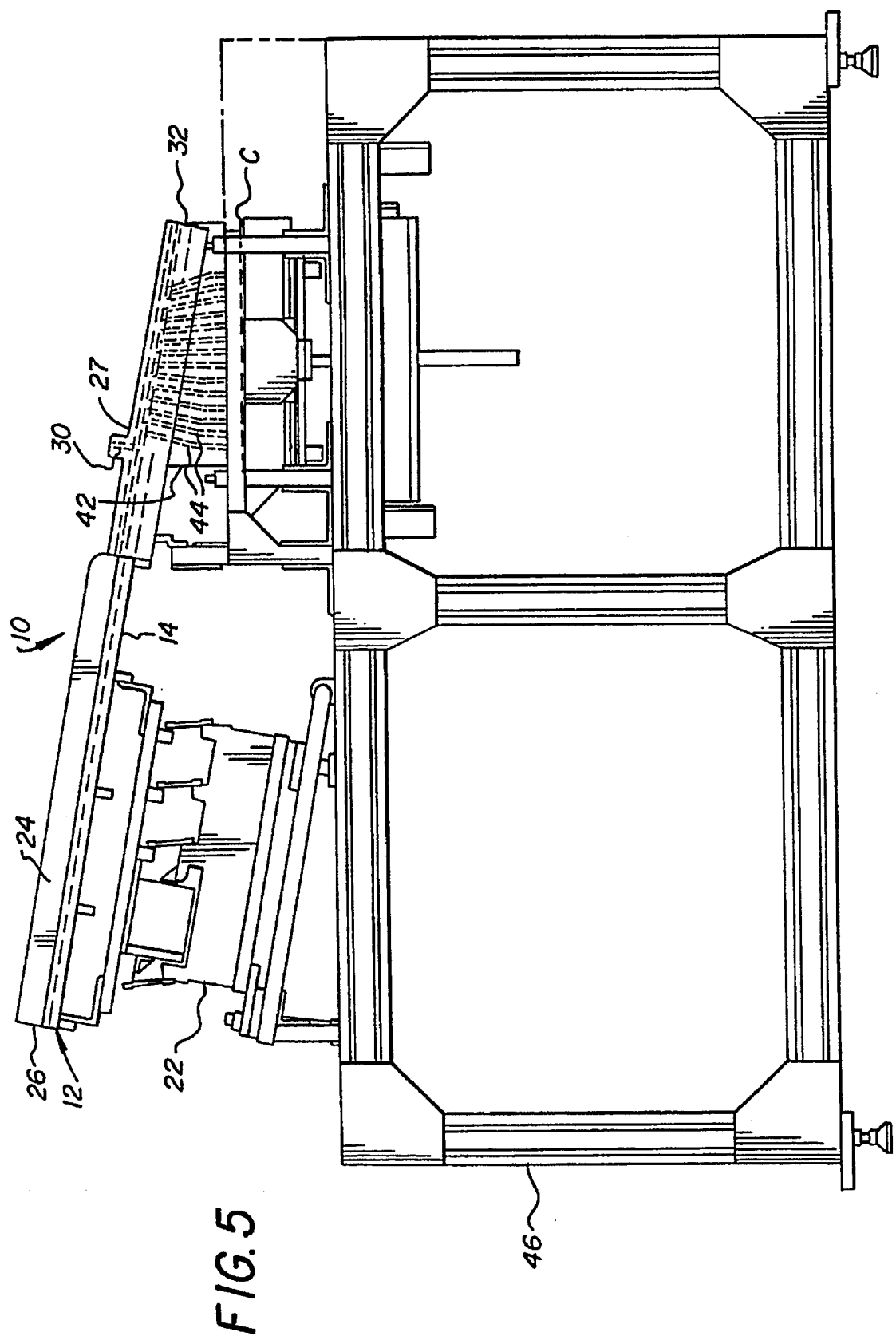

5,579,951

APPARATUS FOR ORIENTING AND LOADING SOLID COMPACT MEDICAMENTS

FIELD OF THE INVENTION

The invention relates to an apparatus for orienting and then loading solid compact medicaments. More particularly, the invention is concerned with an apparatus for feeding, orienting and then loading bulk solid compact medicaments into a carrier device for processing.

BACKGROUND OF THE INVENTION

In the marketing of solid compact medicaments, there is a clear consumer preference for shiny, capsule-like, single or multiple color solid dosage form that is easy to swallow. Generally, gelatinous coatings have been used to achieve a shiny surface on a solid dosage form, also referred to herein as a caplet, pill, tablet, and the like. Caplets are solid, substantially cylindrical shaped medicaments (or elongated shaped); pills are solid, substantially round shaped medicaments; and, tablets are solid, substantially spherical shaped medicaments (see for reference Seitz et al., "Tablet Coating," Chapter 12, Page 346, *The Theory and Practice of Industrial Pharmacy*.)

Existing devices for feeding solid compact medicaments in bulk, and then presenting the solid compact medicaments into a carrier device for processing (e.g., coating) do not have provisions for orienting the solid compact medicaments. Reorientation of the solid compact medicaments prior to processing is essential because of the high speed and large production volume demands during, for example, coating of selective portions of the solid compact medicaments. U.S. Pat. No. 5,102,009 by Katsuo Kato et al, is one such example of a simple small-article feeder that feed articles into a drop plate without changing the orientation of the articles.

Furthermore, there is no device in the prior art that provides for an instantaneous release of several rows of solid compact medicaments at one time, while allowing the pitch of the solid compact medicaments to change in order for the solid compact medicaments to be introduced into a carrier device.

Accordingly, there persists a need for a reliable, high-speed, relatively low maintenance and simple to use apparatus that provides for simultaneous release and loading of several rows of solid compact medicaments at one time, all having the proper orientation and pitch to be introduced to a carrying device for subsequent processing, such as coating.

SUMMARY OF THE INVENTION

To solve one or more problems of the prior art, there is provided an apparatus for orienting and loading generally solid compact medicaments into a carrier device, the carrier device having means for receiving the solid compact medicaments in a predetermined orientation, the apparatus comprising:

a feeder comprising a base, the base having a closed end portion for providing sliding support for the solid compact medicaments and an openable end portion, a plurality of substantially elongated first channels extending along the base through the closed and openable end portions, the first channels having a width sized to accept the solid compact medicaments in an essentially abutting relations therein and to freely pass the solid compact medicaments therethrough with the solid compact medicaments having an acute angle relative to the predetermined orientation;

a blocking member cooperating with the first channels at the openable end portion of the base, the blocking member being capable of stopping the solid compact medicaments in the first channels, the blocking member further at least partially defining a reorientation region for arranging the solid compact medicaments for exiting the openable end portion of the base; and, an orienting member positioned for movement beneath the openable end portion of the base the orienting member comprising a plurality of alternately arranged elongated closed portions and elongated array of spaced through openings, the closed portions and spaced through openings being alternately movably alignable with the first channels, the closed portions being provided for supporting the solid compact medicaments in the first channels, the spaced through openings being provided for releaseably passing the solid compact medicaments therethrough, and the through openings being provided with means for changing the orientation of the solid compact medicaments once in the through openings from the acute angle to the predetermined orientation.

In another aspect of the invention, a method of orienting and loading substantially elongated solid compact medicaments into a carrier device, the carrier device being provided with means for receiving the solid compact medicaments with a predetermined orientation, the method comprising the steps of:

providing the apparatus described above;

loading the solid compact medicaments into the closed end portion of the feeder, the solid compact medicaments initially having an acute angle relative to the predetermined orientation;

urging the solid compact medicaments from the closed end portion to the openable end portion, and then into the re-orientation region of the openable end portion forming a releasable array of solid compact medicaments therein;

positioning said flow control member between last object to be reoriented and upstream solid compact medicaments forming a releasable array of solid compact medicaments therein;

simultaneously releasing the array of solid compact medicaments into the orienting means thereby changing the orientation of the solid compact medicaments from the acute angle to the predetermined orientation.

Accordingly, an important advantage of the present invention is that it provides a reliable, high speed, relatively low maintenance apparatus performing the loading of several rows of solid compact medicaments, at one time, all having the proper orientation and pitch to be introduced to the carrying device.

BRIEF DESCRIPTION OF THE DRAWINGS

The foregoing as well as other solid compact medicaments, features and advantages of this invention will become more apparent from the appended Figures, wherein like reference numerals denote like elements, and wherein:

FIG. 4 is a partial side view, in elevation, of the apparatus showing caplets being reoriented; and, FIG. 5 is a front view of the apparatus supported in a frame.

DETAILED DESCRIPTION OF THE INVENTION

Figure 1:
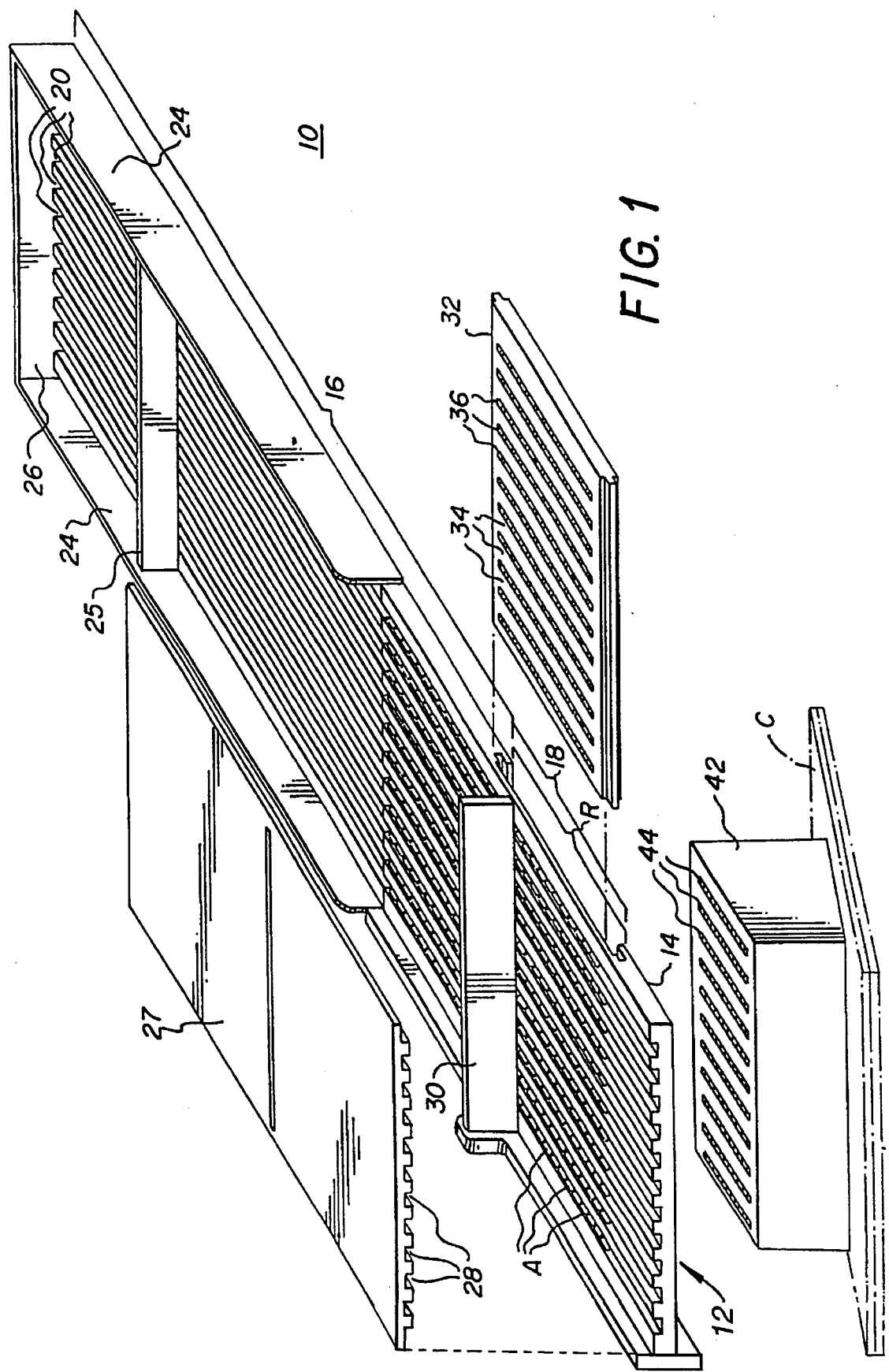
FIG. 1 is an isometric view, partially exploded, of the apparatus according to the principles of the invention.

Turning now to the drawings, and more particularly to FIGS. 1, 4 and 5, the apparatus of the invention for feeding, orienting and loading generally elongated-shaped solid compact medicaments, such as solid compact medicaments (e.g. caplets, tablets, etc.), into a carrier device (C), such as the one described in U.S. Pat. Nos. 5,391,230 and 5,387,287, is illustrated. Carrier device (C) typically has a plurality of regularly arranged openings defining gripping jaws (not shown) configured to accept and secure solid compact medicaments, such as caplets, therein for subsequent processing.

In the preferred embodiment of the invention, generally solid compact medicaments, such as caplets (A), are fed usually in bulk into a feeder 12. According to FIG. 1, feeder 12 comprises a base 14 having closed and openable end portions 16,18 and a plurality of elongated rows of first channels 20. The rows of first channels 20 extend through the closed and openable end portions 16,18 of the base 14. Sidewalls 24 and an adjoining end wall 26 supported respectively on side edges (not shown) and end edge (not shown) of the feeder 12 may be provided to retain the caplets (A) inside the feeder 12 and to impart more rigidity to the feeder 12. Moreover, the first channels 20 have a width sized to accept and freely pass the caplets (A) therethrough with an acute angle relative to the receiving means of the carrier device (C) positioned beneath the openable end portion 18 of the feeder 12. The preferred width of the first channels 20 also ensures that the caplets (A) will remain in an end to end-abutting relations as they pass through the closed and openable end portions 16,18 of the feeder 12. The feeder 12 is normally mounted at an angle between about 5 and 15 degrees of horizontal, preferably 10 degrees, to allow the caplets (A) to slide along the first channels 20 with the assistance of gravity. Alternatively, a vibrator 22 or similar device may also be used to urge the caplets (A) from the first end portion 16 to the second end portion 18 of the feeder 12.

A wiper bar 25 mounted for movement normal to the flow of caplets (A) may also be provided. Wiper bar 25 is preferably mounted in the closed end portion 16 of the feeder 12 for urging the caplets into the first channels 20, thereby minimizing jamming of caplets. Moreover, wiper bar 25 is positioned so as to contact caplets (A) freely moving in a plane above the first channels 20.

Alternatively, feeder 12 may comprise an enclosing means, preferably a cover 27, having rows of elongated channels, which enclosing means fits over and corresponds with the rows of first channels 20 in the feeder 12. Cover 27 may be supported on a top edge of sidewalls 24 and positioned thereon to particularly enclose the re-orientation region (R) in the openable end portion 18 of the feeder 12.

Further, apparatus 10 is provided with a blocking member 28 cooperating with the openable end portion 18 of the base 14 for selectively blocking and controlling the flow of caplets (A) passing through the openable end portion 18.

Figure 3:
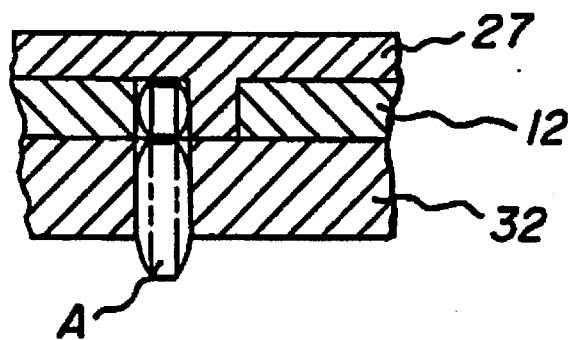
FIG. 3 is a fragmentary cross sectional view along line 3—3 of FIG. 4 showing the caplets reoriented for loading.

Blocking member 28 is positioned so as to at least partially define an object or caplet (A) re-orientation region (R) for arranging a predetermined array of caplets (A) for simultaneously exiting the openable end portion 18 of the feeder 12. In an alternative embodiment, a cooperating flow control member 30 positioned preferably upstream of the blocking member 28 and proximal to the interface of the openable and closed end portions 16,18 of the feeder 12 may be provided so as to particularly define a caplet drop zone in the reorientation region (R). As illustrated in FIG. 3, caplets (A) in the drop zone are aligned for exiting the openable end portion 18 of the feeder 12 through corresponding openings in the cooperating receiving member, as described below.

Figure 2:
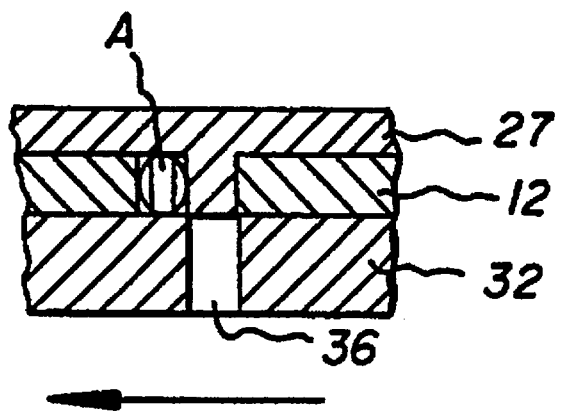
FIG. 2 is a fragmentary cross sectional view along line 2—2 of FIG. 4 showing the caplet prior to reorientation.

In FIGS. 1 and 4, an orienting member 32 positioned for slidable movement beneath the openable end portion 18 of the feeder 12 receives and then orients the caplets (A) from their initial acute angle orientation. Orienting member 32 reorients the caplets (A) to have an orientation conforming with the receiving means of the carrier device (C). In the preferred embodiment, orienting member 32 comprises a plurality of alternately arranged elongated rows of closed portions 34 and elongated rows of spaced through openings 36. According to FIGS. 2 and 3, the rows of closed portions 34 and spaced through openings 36 are alternately movably alignable with the rows of first channels 20 such that the closed portions 34 provide support for the solid compact medicaments in the first channels 20 and the spaced through openings 36 provide for a means for simultaneous release of the solid compact medicaments from the first channels 20. Moreover, the spaced through openings 36 are provided with means for changing the orientation of the solid compact medicaments once in the through openings 36 from the acute angle to the required predetermined orientation. Orientation changing means 38 comprise a tapered entrance portion 40 surrounding the through opening 36 which allows an end portion of the caplet (A) to initially extend beyond the through opening 36, and then fall downward into and through the through opening 36 (See FIG. 4).

According to FIGS. 1, 4 and 5, in alternative embodiment of the invention, the apparatus 10 may comprise means positioned in fluid communications with the elongated rows of spaced through openings 36 in the orienting means 32 for changing the pitch of the solid compact medicaments exiting the orienting means 32. The pitch changing means 42 preferably comprises a plurality of substantially downwardly directed, essentially arcuate-shaped second channels 44 sized to maintain the flow of the solid compact medicaments or caplets (A) with the predetermined orientation so that the solid compact medicaments can be loaded into the receiving means of the carrier device (C). Moreover, according to FIG. 5, each of the aforementioned elements of the apparatus may be positioned in a frame 46 while maintaining the cooperative associations required by the invention.

In operation, caplets (A) are first loaded (typically in bulk) into the closed end portion 16 of the feeder 12. The caplets (A) will then slide down the rows of angled first channels 20 until the lead caplet (A) in each row encounters the blocking member 28 in the openable end portion 18 of the feeder 12. The next and successive caplets (A) in each of the rows will be stopped when they encounter the previously stopped caplet (A) in its respective row. Since the blocking member 28 is positioned normal to rows of first channels, the rows of caplets (A) formed by traveling down the first channels 20 will come to rest in columns in the re-orientation region (R), described above. When the re-orientation region (R) is filled with caplets (A), flow control member 30 (described above) is positioned so as not to allow any additional caplets (A) to enter the re-orientation region (R) prior to the re-orientation of the caplets (A) in the region (R).

With the rows of caplets (A) stopped in position between the blocking member 28 and the flow control member 30, the rows of caplets are actually resting on corresponding rows of closed portions 34 of orienting member 32. Caplets (A) in this position are ready for release and re-orientation. The orienting member 32 has rows of elongated through openings 36 which are positioned so that they have the same pitch as the stopped caplets (R) in the re-orientation zone (R). The through openings 36 are presented to the caplets (A) when the orienting member 32 is moved on a nearly horizontal plane, generally normal to the flow direction of caplets (A) in the first channels 20. Upon actuation of the orienting member 32, the closed portion 34 is moved away from the rows of caplets (A) in the reorientation region (R) and the caplets (A) are presented with the elongated rows of spaced through openings 36. The caplets (A) then fall through the through openings 36, thereby changing their orientation from a generally acute angle to an angle conforming to the requirements of the carrier device (C).

In an alternative embodiment, caplets (A) exiting orienting member 32 may then enter pitch changing means 42, described in details above. Means 42 is configured to accept the caplets (A) at a pitch that is predetermined by the requirements of the receiving means of the carrier device (C). The caplets (A) entering the pitch changing means 42 are directed through the second channels 44 so as to enable the caplets (A) to fall freely into the receiving means of the carrier device (C).

The invention has therefore been described with reference to certain embodiments thereof, but it will be understood that variations and modifications can be effected within the scope of the invention.

PARTS LIST

Caplets A
Carrier Device C
Reorientation Region R
Apparatus 10
Feeder 12
Base 14
Closed end portion 16
Openable end portion 18
First Channels 20
Vibrator 22
Sidewalls 24
Wiper Bar 25
End Wall 26
Cover 27
Blocking Member 28
Flow Control Member 30
Orienting Bar 32
Closed Portions 34
Through openings 36
Orientation changing means 38
Entrance Portion 40
Pitch Changing Means 42
Second Channels 44
Frame 46

We claim:

1. An apparatus for orienting and loading generally solid compact medicaments into a carrier device, said carrier device having means for receiving said solid compact medicaments in a predetermined orientation, said apparatus comprising:

a feeder comprising a base, said base having a closed end portion for providing sliding support for said solid compact medicaments and an openable end portion, a plurality of substantially elongated first channels extending along said base through said closed and openable end portions, said first channels having a width sized to accept said solid compact medicaments in an essentially abutting relations therein and to freely pass said solid compact medicaments therethrough with said solid compact medicaments having an acute angle relative to said predetermined orientation;

a blocking member cooperating with said first channels at said openable end portion of said base, said blocking member being capable of stopping said solid compact medicaments in said first channels, said blocking member further at least partially defining a reorientation region for arranging said solid compact medicaments for exiting said openable end portion of said base; and, an orienting member positioned for movement beneath said openable end portion of said base, said orienting member comprising a plurality of alternately arranged elongated rows of closed portions and elongated rows of spaced through openings, said rows of closed portions and spaced through openings being alternately movably alignable with said first channels, said closed portions being provided for supporting said solid compact medicaments in said first channels, said spaced through openings being provided for simultaneously releaseably passing said solid compact medicaments therethrough, and wherein said spaced through openings are provided with means for changing the orientation of said solid compact medicaments once in said through openings from said acute angle to said predetermined orientation.

2. The apparatus recited in claim 1 further comprising means in fluid communications with said elongated array of spaced through openings in said orienting means for changing the pitch of the solid compact medicaments exiting said orienting means, said pitch changing means comprising a plurality of substantially downwardly directed, essentially arcuate-shaped second channels sized to maintain the flow of said solid compact medicaments with said predetermined orientation so that said solid compact medicaments can be loaded into said receiving means of said carrier device.

3. The apparatus recited in claim 2 wherein said means for changing the pitch of said solid compact medicaments comprises a tapered object entrance portion at least partially surrounding said elongated spaced openings for initially changing the orientation of said solid compact medicaments from said acute angle to about said predetermined orientation.

4. The apparatus recited in claim 2 further comprising a frame for supporting said feeder, said blocking member, said orienting member and said pitch changing member in a cooperative relationship, said feeder being positioned on said frame.

5. The apparatus recited in claim 1 further comprising means for enclosing said first channels of said feeder for retaining the solid compact medicaments therein.

6. The apparatus recited in claim 5 wherein said enclosing means is supported on a top edge of sidewalls surrounding the first channels, said enclosing means being positioned so as to particularly cover said reorientation region in said operable end portion of said feeder.

7. The apparatus recited in claim 1 wherein said feeder is pitched so as to provide gravity assisted movement of said solid compact medicaments in said first channels.

8. The apparatus recited in claim 7 wherein said feeder is pitched at an angle in the range of about 5 to 15 degrees.

9. The apparatus recited in claim 1 further provided with vibrating means communicating with the base for urging the solid compact medicaments between said closed and operable end portions of said feeder.

10. The apparatus recited in claim 1 further comprising a flow control member positioned in said operable end portion of said feeder upstream of said blocking member, said flow control member and said blocking means defining therebetween an object drop zone in said re-orientation region.

11. The apparatus recited in claim 10 wherein said flow control member is pivotably connected to sidewalls surrounding the first channels.

12. The apparatus recited in claim 10 wherein said blocking member is structurally connected to means for enclosing said first channels of said feeder for retaining the solid compact medicants therein.

13. The apparatus recited in claim 1 further comprising means positioned for movement in the closed end portion of the feeder for urging the solid compact medicaments into the first channels thereby reducing jams.

14. A method of orienting and loading substantially elongated solid compact medicaments into a carrier device, said carrier device being provided with means for receiving said solid compact medicaments with a predetermined orientation, said method comprising the steps of:

providing the apparatus of claim 1;

loading the solid compact medicaments into said closed end portion of said feeder, said solid compact medicaments initially having an acute angle relative to said predetermined orientation;

urging the solid compact medicaments from said closed end portion to said openable end portion, and then into said reorientation region of said openable end portion;

positioning said flow control member between last object to be reoriented and upstream solid compact medicaments forming a releasable array of solid compact medicaments therein;

simultaneously releasing said array of solid compact medicaments into said orienting means thereby changing the orientation of said solid compact medicaments from said acute angle to said predetermined orientation; and, releasing said array of solid compact medicaments having said predetermined orientation into said receiving means of said carrying device.

15. The method recited in claim 14 further comprising the step of providing means in fluid communications with said elongated array of spaced through openings in said orienting means for changing the pitch of the solid compact medicaments exiting said orienting means, said pitch changing means comprising a plurality of substantially downwardly directed, essentially arcuate-shaped second channels sized to maintain the flow of said oriented solid compact medicaments so that said solid compact medicaments can be loaded into said receiving means of said carrier device.

* * * * *

UNITED STATES PATENT AND TRADEMARK OFFICE
CERTIFICATE OF CORRECTION

PATENT NO. : 5,579,951
DATED : December 3, 1996
INVENTOR(S) : David Revelle, et al.

It is certified that error appears in the above-indentified patent and that said Letters Patent is hereby corrected as shown below:

Column 7, lines 5-6, delete "operable" and insert --openable--;

Column 7, line 8, delete "operable" and insert --openable--.

Signed and Sealed this

Second Day of September, 1997

*Attest:*

*Attesting Officer*

BRUCE LEHMAN

*Commissioner of Patents and Trademarks*